(12) United States Patent
Kim

(10) Patent No.: US 8,006,592 B2
(45) Date of Patent: Aug. 30, 2011

(54) BURR ELIMINATION DEVICE FOR CAMSHAFT

(75) Inventor: Mu Hyung Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 324 days.

(21) Appl. No.: 12/421,305

(22) Filed: Apr. 9, 2009

(65) Prior Publication Data

US 2010/0107830 A1    May 6, 2010

(30) Foreign Application Priority Data

Oct. 30, 2008 (KR) .................. 10-2008-0107184

(51) Int. Cl.
*B23B 5/10* (2006.01)
*B21K 1/12* (2006.01)

(52) U.S. Cl. ...................... 82/106; 82/109; 29/888.1

(58) Field of Classification Search ............ 82/106, 82/109; 29/888.1, 6.01, 33 A, 76.1; 234/49, 234/50

See application file for complete search history.

(56) References Cited

U.S. PATENT DOCUMENTS

| | | | | |
|---|---|---|---|---|
| 2,404,180 A | * | 7/1946 | King et al. ............ | 29/33 A |
| 2,827,963 A | * | 3/1958 | Anders ............ | 234/60 |
| 3,757,615 A | * | 9/1973 | Oeming et al. ......... | 82/106 |
| 3,795,161 A | * | 3/1974 | Berbalk ............ | 82/106 |
| 3,935,765 A | * | 2/1976 | Peltier et al. ......... | 82/19 |
| 3,948,076 A | * | 4/1976 | Eitel et al. ........... | 72/384 |
| 4,297,926 A | * | 11/1981 | Russ et al. ........... | 82/106 |
| 4,800,683 A | * | 1/1989 | Schwar ............ | 451/152 |
| 6,026,549 A | * | 2/2000 | Makino et al. ......... | 29/27 R |

FOREIGN PATENT DOCUMENTS

| | | |
|---|---|---|
| JP | 64-040269 | 2/1989 |
| JP | 03098754 A | 4/1991 |
| JP | 2007320008 A | 12/2007 |

* cited by examiner

*Primary Examiner* — Will Fridie, Jr.
(74) *Attorney, Agent, or Firm* — Edwards Angell Palmer & Dodge LLP; Peter F. Corless

(57) ABSTRACT

A burr elimination device for a camshaft according to the exemplary embodiment of the present invention may include: an operating cylinder configured to move a rod equipped in an end portion thereof in an up and down direction; an ascent/descent member connected to the rod of the operating cylinder; a rotation unit configured to rotate a camshaft that is held apart from the ascent/descent member and on which cam lobes are formed; a plurality of cylinder members disposed on the ascent/descent member corresponding to the cam lobes; a moving rod configured to be inserted into or drawn out of each of the cylinder members; a spring mounted inside each of the cylinder members and configured to elastically push the moving rod from the interior to the exterior of the cylinder member; and a burr elimination tool that is mounted on the end portion of the moving rod and that is configured to pivot in front/rear and left/right directions with respect to a predetermined center point for continuous elimination of a burr that is formed at an edge of a cam lobe.

11 Claims, 8 Drawing Sheets

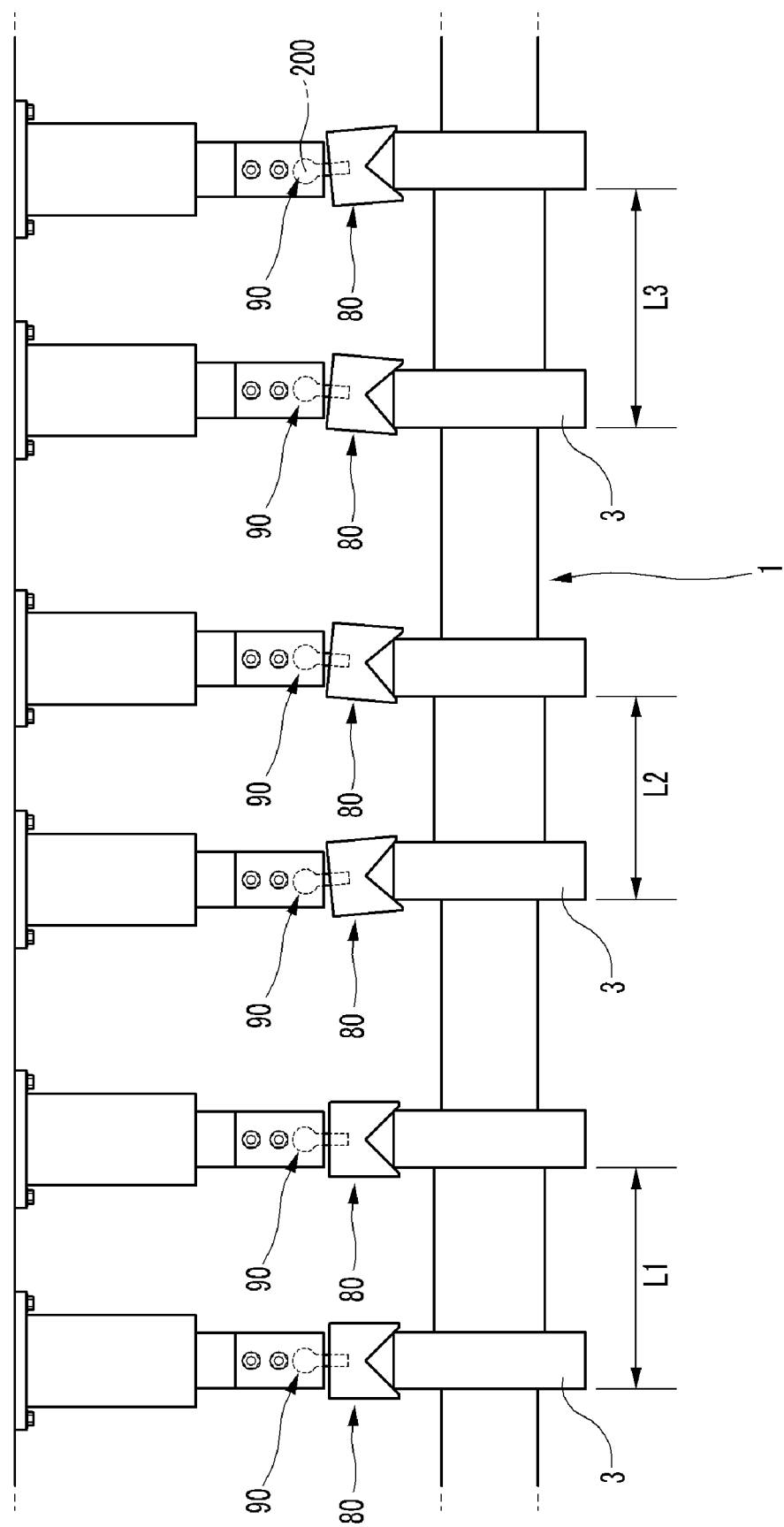

BURR ELIMINATION DEVICE FOR CAMSHAFT

CROSS-REFERENCE TO RELATED APPLICATION

This application claims priority to and the benefit of Korean Patent Application No. 10-2008-0107184 filed on Oct. 30, 2008, the entire contents of which are incorporated herein by reference.

BACKGROUND OF THE INVENTION (a) Field of the Invention

The present invention relates to a burr elimination device for a camshaft, and more particularly to a burr elimination device for a camshaft for eliminating burrs that are formed at an edge portion of a cam lobe in the grinding process of a camshaft.

(b) Description of the Related Art

Generally, a vehicle maker performs a large number of processes from material selection to mass production so as to fabricate one complete vehicle.

Particularly, a body of a component such as a camshaft, a crankshaft, and so on is formed through a casting process, and then the body further passes through a variety of processes to become a finished product.

The camshaft and crankshaft are made through the casting process, for example by pouring molten metal at a high temperature into a mold including an upper mold and a lower mold and then separating the upper mold and the lower mold.

The camshaft passes through a grinding process in which the surface thereof is ground in an engine fabrication line, and a burr is formed at an edge portion of the cam lobe in this process.

Further, when a brush-type burr elimination tool is used to eliminate the burr (de-burr), scratches are formed on the surface of the cam lobe such that the quality of the camshaft is deteriorated.

In addition, when there are position tolerances or position differences between the cam lobes, the burr elimination efficiency is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a burr elimination device for a camshaft having advantages of increasing the life span of a burr elimination tool and also improving the quality thereof by applying a burr elimination tool that is made of tool steel.

Also, the present invention has been made in an effort to provide a burr elimination device for a camshaft having advantages of flexibly changing the phase of a burr elimination tool according to profile and position differences among cam lobes to effectively eliminate the burr of the cam lobe.

A burr elimination device for a camshaft according to an aspect of the present invention may include an operating cylinder, an ascent/descent member, a rotation unit, cylinder members, moving rods, springs, and burr elimination tools.

More specifically, the operating cylinder is configured to move a rod equipped in an end portion thereof in an up-and-down direction. The ascent/descent member is connected to the rod of the operating cylinder. The rotation unit is configured to rotate a camshaft that is held apart from the ascent/descent member and cam lobes are formed thereon. The cylinder members are disposed on the ascent/descent member corresponding to the cam lobes. Each of the moving rods is configured to be inserted into or drawn out of the corresponding cylinder member. Each of the springs is configured to elastically push the corresponding moving rod from the interior to the exterior of the corresponding cylinder member. Each of the burr elimination tool is mounted on end portions of the corresponding moving rod and is configured to pivot in front/rear and left/right directions with respect to a predetermined center point for continuous elimination of a burr that is formed at an edge of a cam lobe.

A V-shaped burr elimination cut-out which contacts edge portions of the cam lobe may be formed in the burr elimination tool, and a serration of a lattice shape may be formed on all or some of the surface of the burr elimination cut-out.

Each of the burr elimination tools is rotatably connected to a protruding end portion of the corresponding moving rod through a ball joint.

The moving rods each may include a rod body and a mounting portion. The rod body is disposed inside the corresponding cylinder member and is provided with a shoulder formed at an exterior circumference thereof. The mounting portion may be formed at the end portion thereof such the burr elimination tool may be mounted thereto.

The mounting portion may include a first part that is integrally formed in the end portion of the rod body and a second part that is combined to the first part through a bolt.

The ball joint may be rotatably mounted between the first and second parts. A mounting socket may be respectively formed in the first and second parts for the ball joint to be mounted.

The ball joint may include a ball member that is rotatably supported by the end portion of the moving rod, and a ball stud that is inserted into the burr elimination tool to be connected thereto.

The ball joint includes a ball member that is disposed in the mounting socket and a ball stud that is integrally formed with the ball member to be inserted into the burr elimination tool, and the mounting socket includes a socket that is jointly formed in the first member and the second member to support the ball member and a clearance hole that communicates with the socket to allow the ball stud to freely protrude therethrough.

Each of the burr elimination tools is provided with a union hole into which the ball stud is inserted.

A burr elimination device for a camshaft according to another aspect of the present invention may include an operating cylinder, a rotation unit, moving rods, springs, and burr elimination tools.

The rotation unit is configured to rotate a camshaft on which cam lobes are formed. Each of the moving rods is movable in an up/down direction by the operating cylinder. Each of the springs is configured to elastically support the corresponding moving rod. Each of the burr elimination tools is connected to the end portion of each of the moving rods through a ball joint to continuously eliminate a burr that is formed at the edge portion of a cam lobe. The burr elimination tool is pivotal in front/rear and left/right directions within a predetermined angle so that one side surface of a burr elimination cut-out which contacts edge portions of the exterior circumference of the cam lobe coincides with a tangential line passing the exterior circumference.

As described above, in a burr elimination device for a camshaft according to an exemplary embodiment of the present invention, the serration is formed on the surface of the burr elimination cut-out and the tool steel with improved hardness by heat treatment is applied thereto to be able to increase the life span thereof.

Also, according to the profile and shape of the cam lobes in the present exemplary embodiment, the burr elimination tool flexibly moves in a vertical direction and simultaneously pivots in left/right and front/rear directions to contact the cam lobes with uniform force such that the burr elimination efficiency is improved.

Further, in the present exemplary embodiment, only the edge portion of the cam lobe contacts the surface of the V-shaped burr elimination cut-out such that a scratch is not formed on the surface of the cam lobe.

In addition, in the present exemplary embodiment, the burr elimination tool compensates position differences of the cam lobes such that the burr elimination tool can flexibly eliminate burrs from a variety of kinds of camshafts.

BRIEF DESCRIPTION OF THE DRAWINGS

While the drawings are described in connection with what is presently considered to be practical exemplary embodiments, it is to be understood that the invention is not limited to the disclosed drawings.

FIG. 5A to FIG. 5D respectively show operating states of a burr elimination device for a camshaft according to an exemplary embodiment of the present invention.

Figure 1:
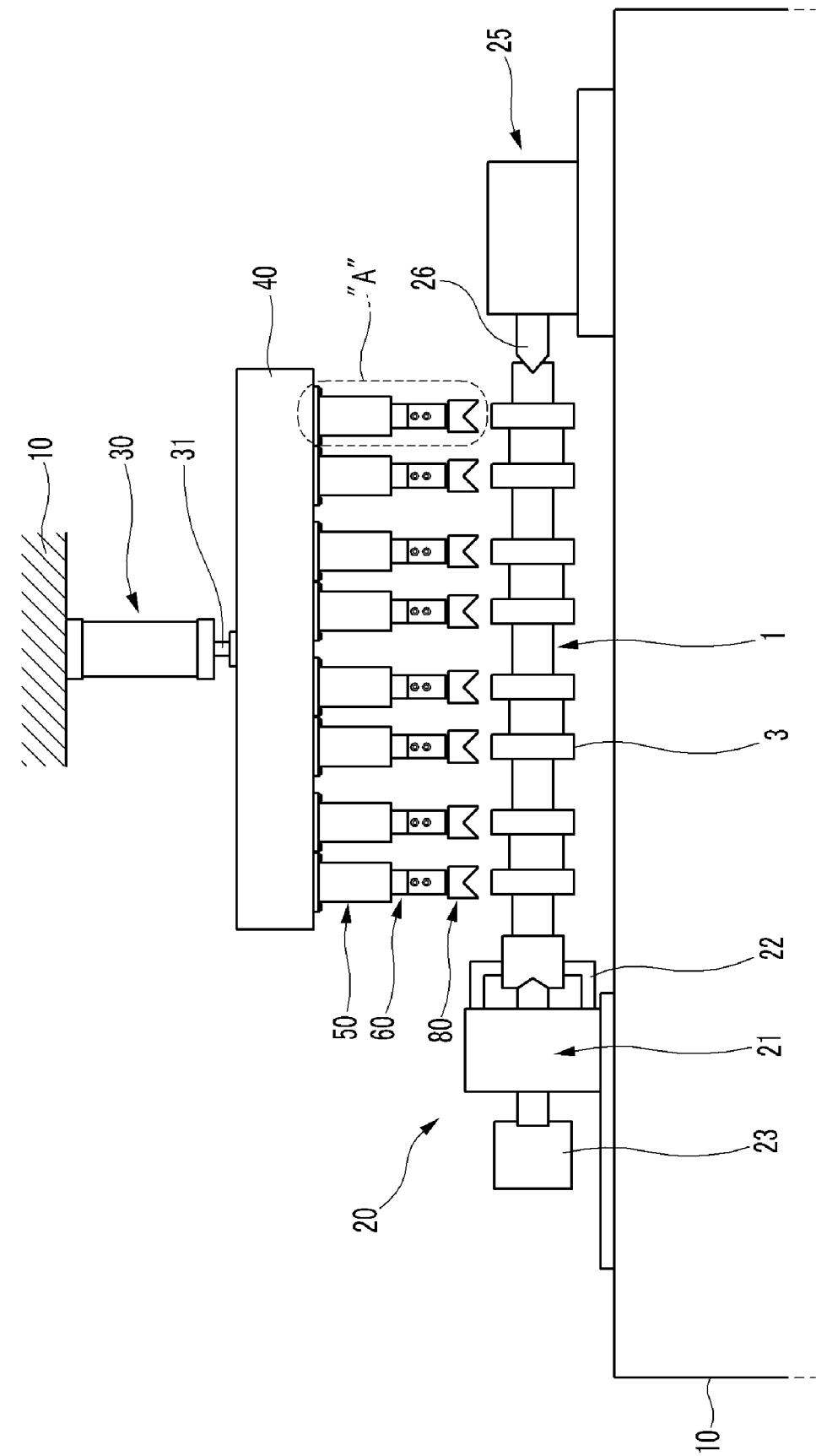
FIG. 1 is a schematic diagram of a burr elimination device for a camshaft according to an exemplary embodiment of the present invention.

Reference numerals set forth in the Drawings includes reference to the following elements as further discussed below:

3: cam lobe
10: frame
20: rotation unit
21: chucking member
22: damper
25: centering member
26: center pin
30: operating cylinder
31: operating rod
40: ascent/descent member
50: cylinder member
51: flange
53: penetration hole
55: bolt
60: moving rod
61: shoulder
63: body
65: mounting portion
67: mounting socket
70: spring
80: burr elimination tool
81: burr elimination cut-out
82: serration
85: union hole
90: ball joint
91: ball member
93: ball stud
100: burr elimination device
101: camshaft
200: center point

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

FIG. 1 is a schematic diagram of a burr elimination device 100 for a camshaft according to an exemplary embodiment of the present invention.

Referring to the drawing, a burr elimination device 100 for a camshaft according to an exemplary embodiment of the present invention is applied to an engine manufacturing line so as to fabricate a camshaft 1 that is a constituent element of a vehicle engine.

In this case, the camshaft 1 is fabricated through a casting process in the engine manufacturing line, and then a plurality of cam lobes 3 thereof are formed through a grinding process.

The burr elimination device 100 according to the present exemplary embodiment eliminates burrs that are formed at an edge portion of the cam lobes 3 in the grinding process of the camshaft 1.

The burr elimination device 100 for a camshaft has a block structure, differing from a brush-type tool, and provides uniform pressure to the respective cam lobes 3 when the cam lobes 3 rotate.

Further, the burr elimination device 100 flexibly compensates position differences according to manufacturing errors and specifications of the camshaft 1 to be able to eliminate the burr of the cam lobe 3.

A frame 10 for supporting each constituent elements include various parts such as a bracket, a supporting block, a plate, a housing, a cover, a collar, and so on.

The burr elimination device 100 for a camshaft according to an exemplary embodiment of the present invention includes a rotation unit 20, an operating cylinder 30, an ascent/descent member 40, cylinder members 50, a moving rod 60, a spring 70 (see FIG. 2), and a burr elimination tool 80.

The rotation unit 20 supports and rotates the camshaft 1 mounted on the frame 10.

The rotation unit 20 that clamps one end portion of the camshaft 1 includes a chucking member 21 configured to provide rotation torque and a centering member 25 configured to support the center portion of the other end portion of the camshaft 1.

The chucking member 21 that is configured to be reciprocated in a length direction of the camshaft 1 on the frame 10 includes a damper 22 for clamping one end portion of the camshaft 1 and a drive motor 23 for rotating the damper 22.

Further, the centering member 25 that is configured to be reciprocated in a length direction of the camshaft 1 on the frame 10 includes a center pin 26 for supporting the rotation center of the camshaft 1.

In the present exemplary embodiment, the operating cylinder 30 is mounted on an upper side of the frame 10 so as to correspond to the rotation unit 20.

The operating cylinder 30 that is fixed on the frame in a vertical direction is equipped with an operating rod 31 that reciprocates in a vertical direction.

The operating cylinder 30 uses, for example, pneumatic pressure as a power source.

In the present exemplary embodiment, the ascent/descent member 40 is combined to the operating rod 31 of the operating cylinder 30 and ascends or descends in a vertical direction.

The respective cylinder members 50 are mounted to be fixed to the ascent/descent member 40 corresponding to the cam lobes 3 of the camshaft 1 that is loaded on the rotation unit 20.

Figure 2:
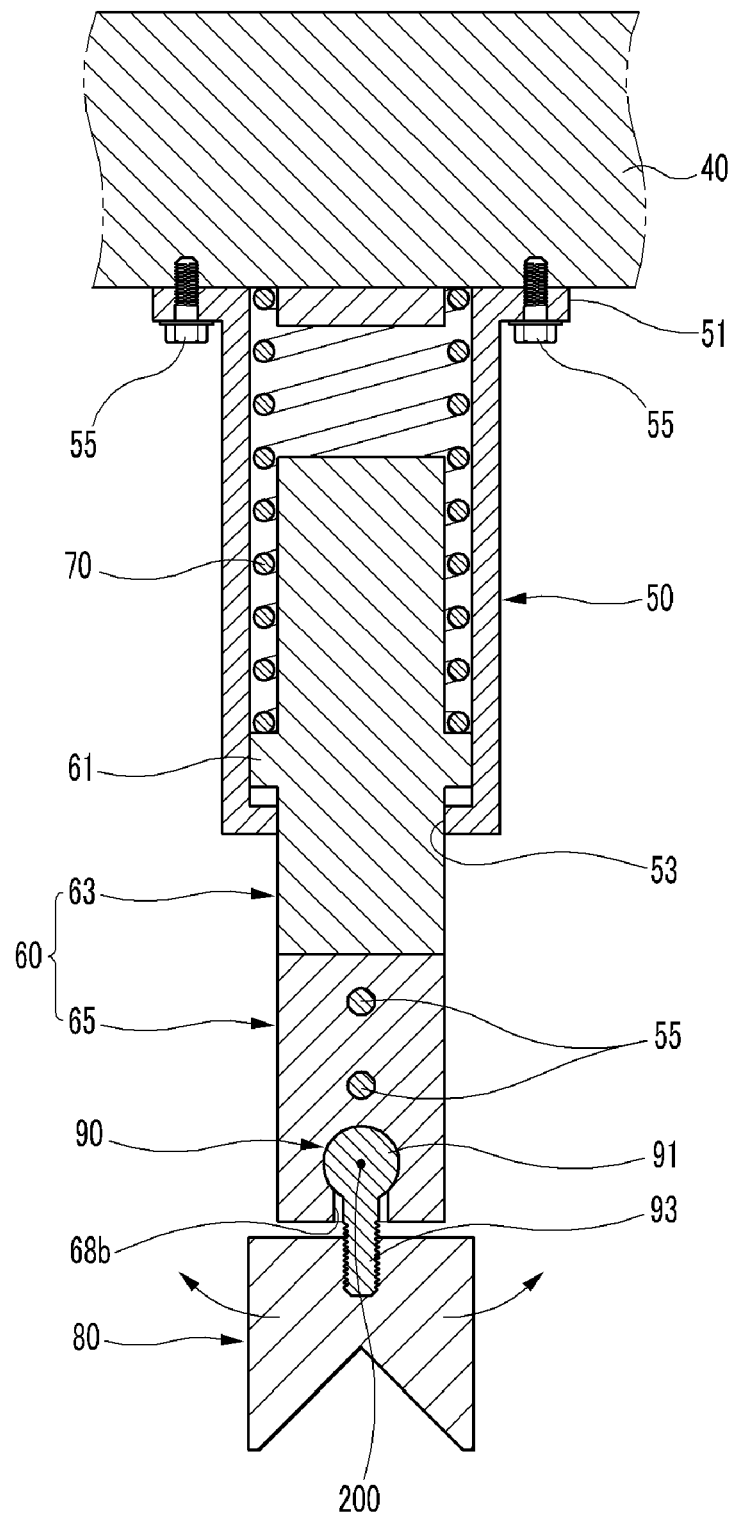
FIG. 2 is a detailed sectional view of the area represented by "A" in FIG. 1.

As shown in FIG. 2, each cylinder member 50 with a housing shape has an inner space. An upper end portion of the cylinder member 50 is opened and a lower end portion thereof is partially closed. A flange 51 is formed in the upper end portion and a penetration hole 53 is formed in the lower end portion.

Here, the flange 51 of the cylinder member 50 is combined to a lower surface of the ascent/descent member 40 by a bolt 55.

In the present exemplary embodiment, the moving rod 60 is projected from the inner space of the cylinder member 50 to the outside thereof through the penetration hole 53 of the cylinder member 50 to be reciprocated in a vertical direction.

The moving rod 60 includes a rod body 63 and a mounting portion 65, wherein the rod body 63 is disposed in the inner space of the cylinder member 50 and is drawn out to the outside through the penetration hole 53 of the cylinder member 50 and a shoulder 61 is formed at an exterior circumference thereof.

In this case, the shoulder 61 prevents the rod body 63 from being drawn outside the cylinder member 50 from the inner space of the cylinder member 50 through the penetration hole 53.

Further, the mounting portion 65 on which the burr elimination tool 80 that is to be hereinafter explained is mounted is formed at an end portion of the rod body 63.

In the present exemplary embodiment, the spring 70 is mounted inside the cylinder member 50, and elastically supports the rod body 63 of the moving rod 60 toward the outside.

Referring to FIG. 2, a ball joint 90 pivots with respect to a center point 200 thereof, and a ball stud 93 is connected thereto.

That is, the burr elimination tool 80 and the ball rod 93 are pivotal in left/right and front/rear directions with respect to the center point 200 by a predetermined angle.

Figure 3:
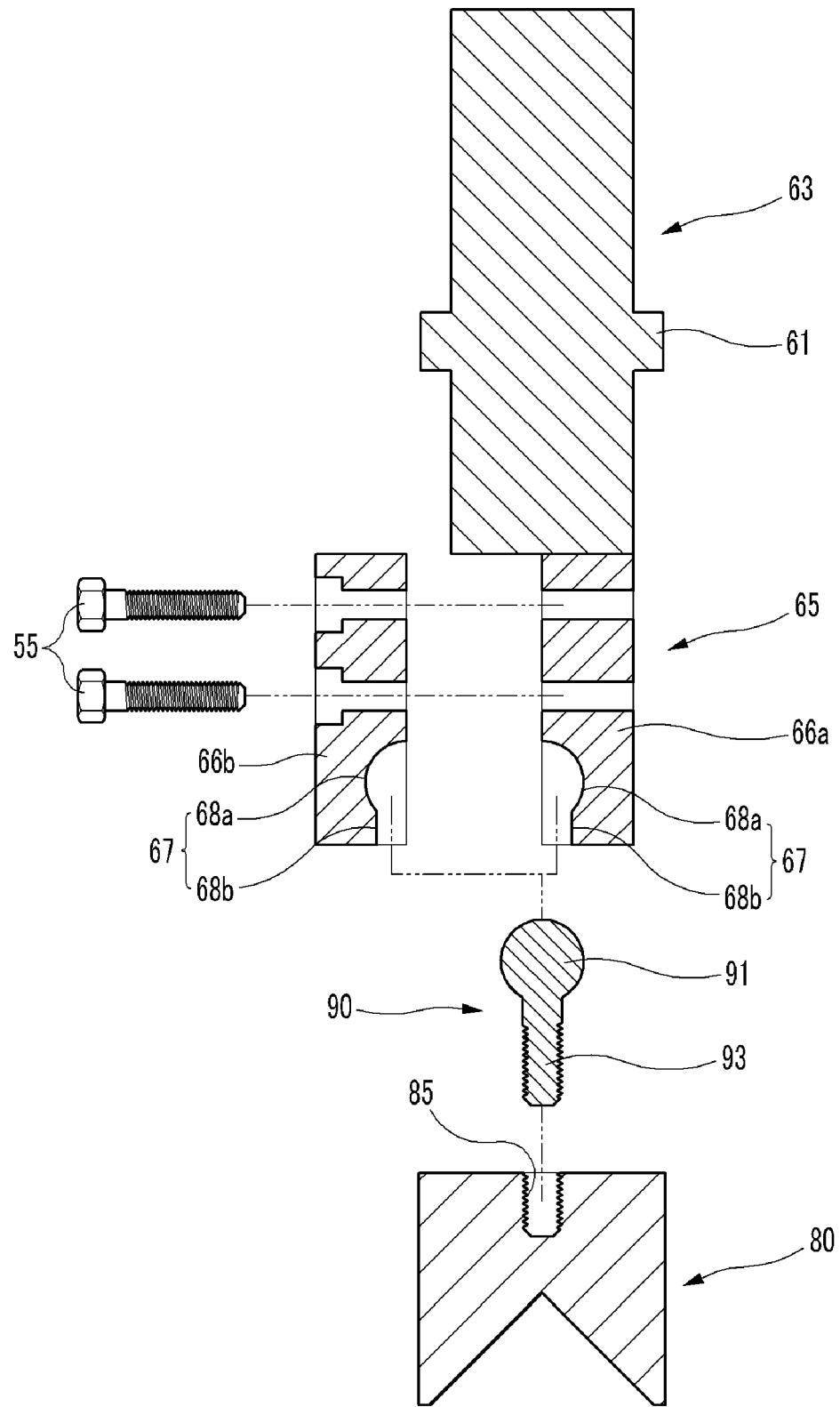
FIG. 3 is a sectional exploded view showing a assembly structure of a moving rod and a burr elimination tool that are applied to a burr elimination device for a camshaft according to an exemplary embodiment of the present invention.

FIG. 3 is a sectional exploded view showing an assembly structure of a moving rod and a burr elimination tool that are applied to a burr elimination device for a camshaft according to an exemplary embodiment of the present invention.

As shown in FIG. 3, the mounting portion 65 includes a first part 66a that is integrally formed with the end portion of the rod body 63 and a second part 66b that is combined to the first part 66a through a pair of bolts 55.

A mounting socket 67 in which the ball joint 90 that is to be hereinafter explained is mounted is formed in the first and second parts 66a and 66b.

The mounting socket 67 is formed in respective surfaces of the first and second parts 66a and 66b facing each other, and includes a socket 68a having a hemispherical shape and a clearance hole 68b that passes through the first and second parts 66a and 66b to be opened in a lower direction.

In this case, the spring 70 is a compression coil spring of which one end portion thereof is supported by the lower surface of the ascent/descent member 40 and the other end portion thereof is supported by the shoulder 61 of the rod body 63.

In the present exemplary embodiment, the burr elimination tool 80 for eliminating the burr at the edge portion of the cam lobes 3 of the camshaft 1 that is loaded in the rotation unit 20 is connected to the mounting portion 65 of the moving rod 60.

Figure 4:
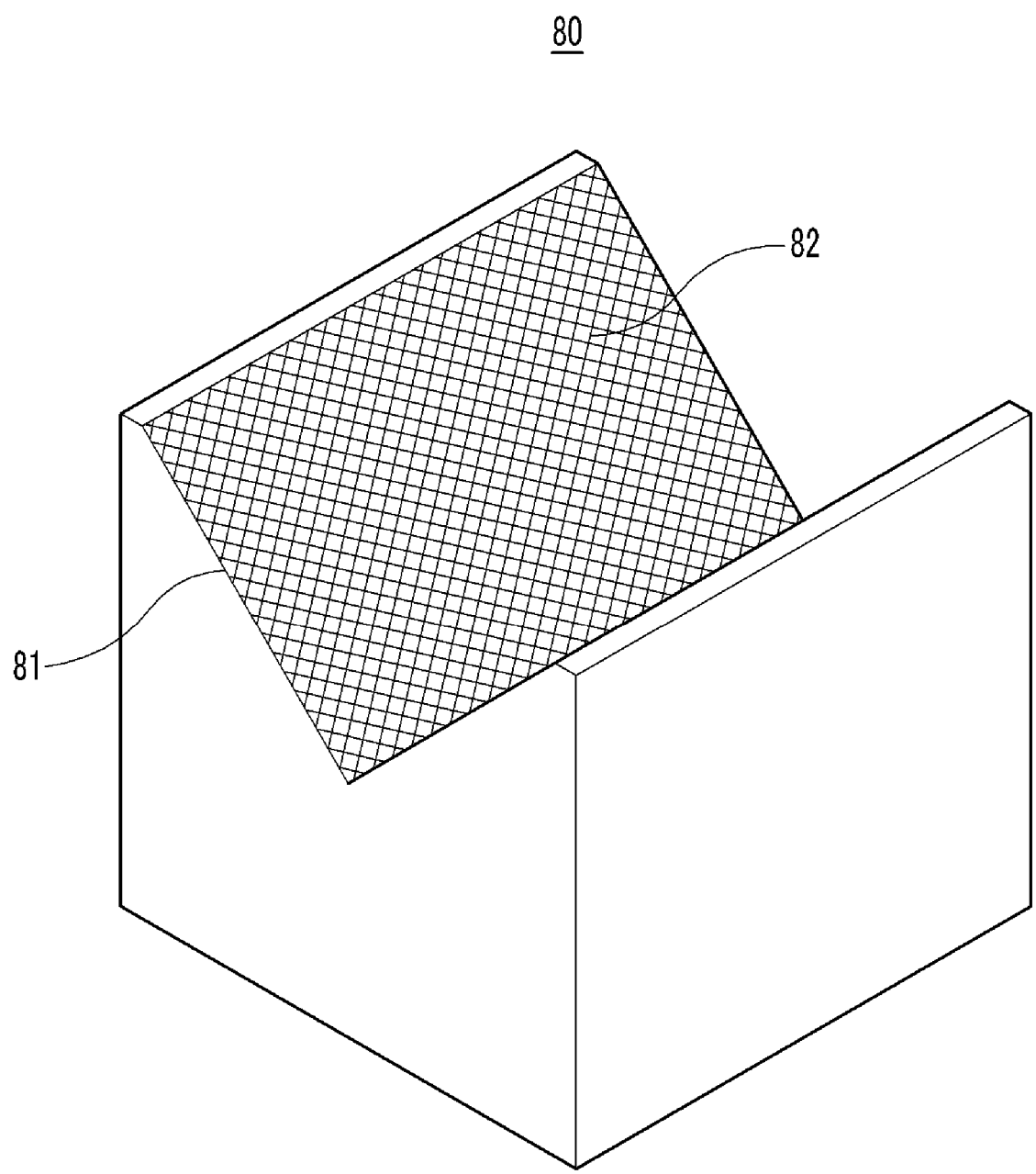
FIG. 4 is a perspective view showing a burr elimination tool that is applied to a burr elimination device for a camshaft according to an exemplary embodiment of the present invention.

FIG. 4 is a perspective view showing the burr elimination tool that is applied to a burr elimination device for a camshaft according to an exemplary embodiment of the present invention.

As shown in FIG. 4, the burr elimination tool 80 is heat-treated to have hardness and is made of tool steel in a block shape, and a V-shaped burr elimination cut-out 81 is formed to contact the edge portion of the cam lobe 3.

Further, a saw-tooth mark of a lattice shape, that is, a serration 82 is formed on the surface of the burr elimination cut-out 81.

As shown in FIG. 2, the burr elimination tool 80 is connected to the mounting portion 65 of the moving rod 60 through the ball joint 90 to be pivotal in front/rear and left/right directions.

As shown in FIG. 3, the ball joint 90 is pivotally mounted in the mounting socket 67 between the first and second parts 66a and 66b of the mounting portion 65, and the burr elimination tool 80 is attached thereto.

In detail, the ball joint 90 includes a ball member 91 with a spherical shape and a ball stud 93 that is integrally formed with the ball member 91.

The ball member 91 corresponds to the shape of the socket 68a in the mounting socket 67 of the first and second parts 66a and 66b.

Further, the ball stud 93 is guided by the clearance hole 68b of the mounting socket 67, and the burr elimination tool 80 is screwed thereto.

That is, the ball member 91 of the ball joint 90 is disposed in the socket 68a of the mounting socket 67, and the ball stud 93 is disposed in the clearance hole 68b.

Here, the ball stud 93 protrudes outside the lower portion of the mounting portion 65, and the protruding portion is screwed into the union hole 85 of the burr elimination tool 80.

Further, a gap is formed between the ball stud 93 and the inner surface of the clearance hole 68b of the mounting socket 67, and the burr elimination tool 80 can pivot in front/rear and left/right directions corresponding to the gap.

The operating procedures of the burr elimination device 100 for a camshaft according to an exemplary embodiment of the present invention are hereinafter detailed referring to the drawings.

FIG. 5A to FIG. 5D respectively show operating states of a burr elimination device for a camshaft according to an exemplary embodiment of the present invention.

Figure 5A:
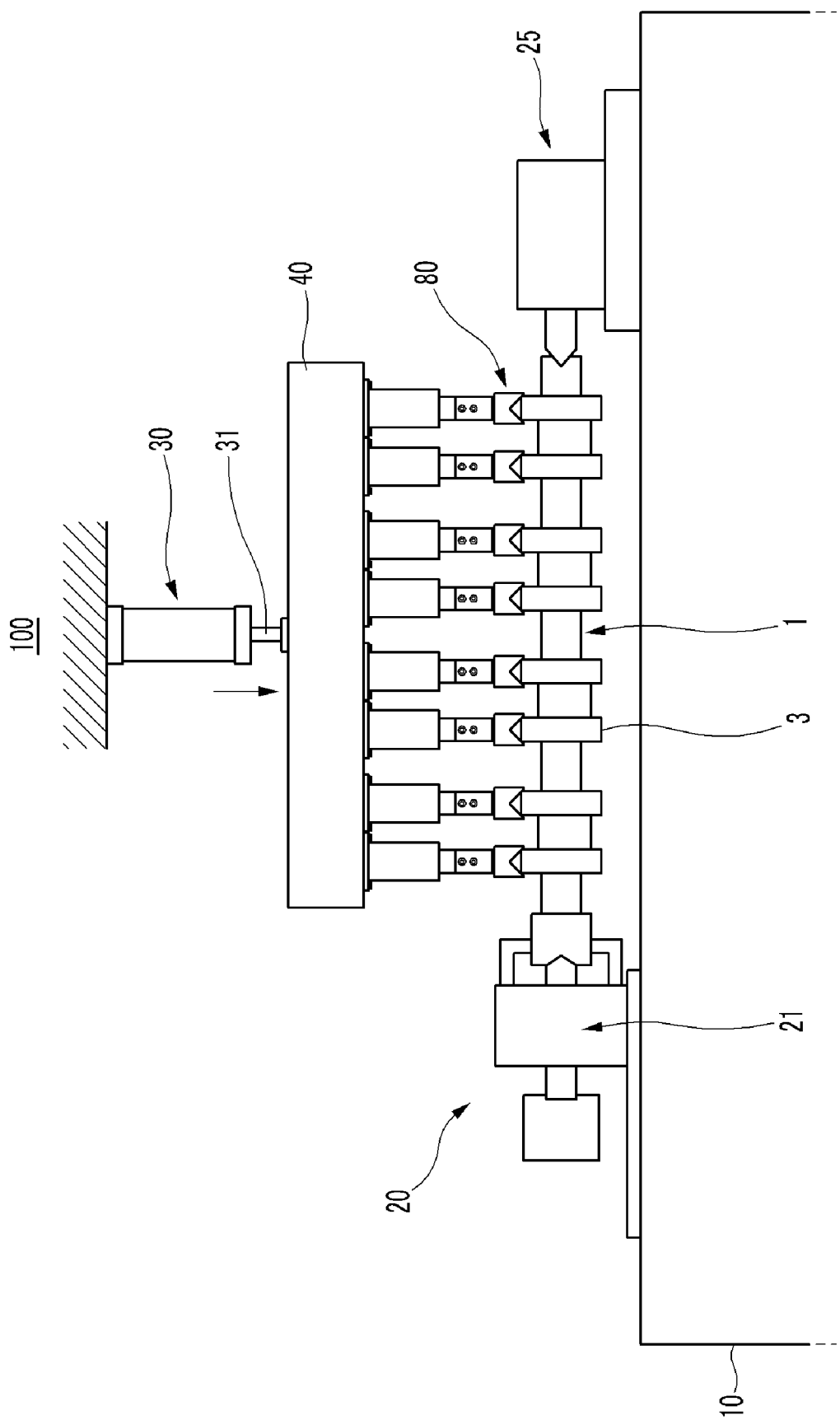
Figure 5B:
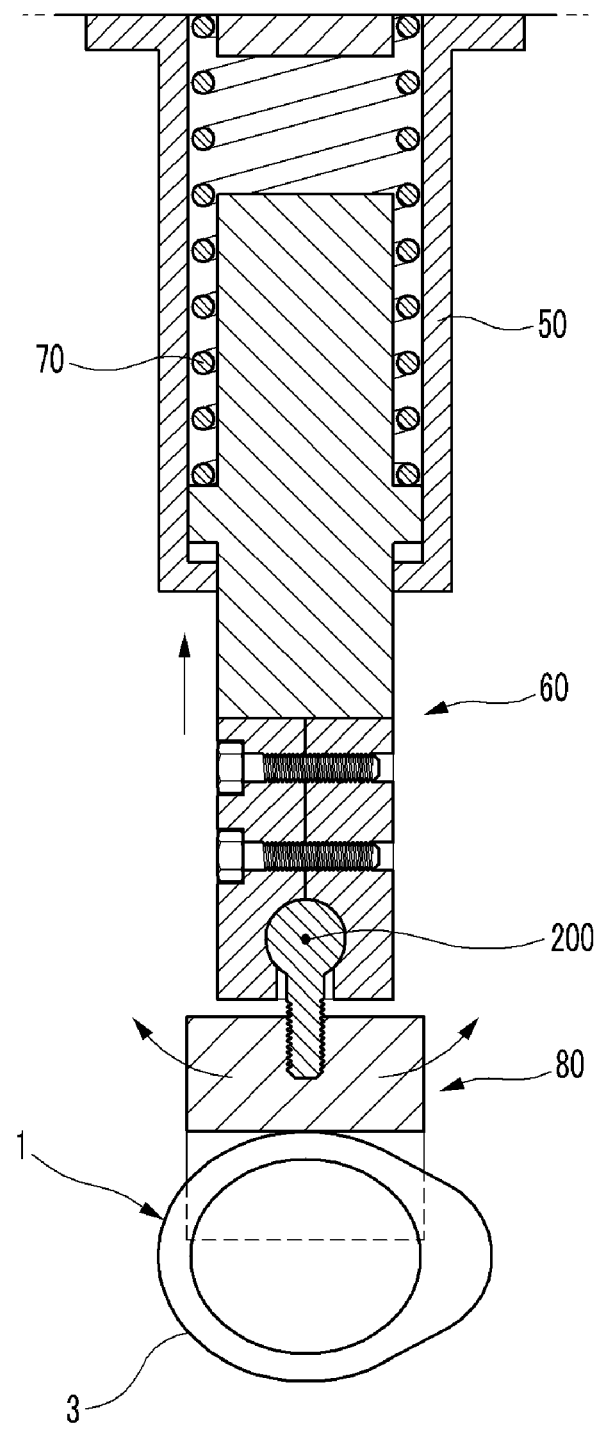
Figure 5C:
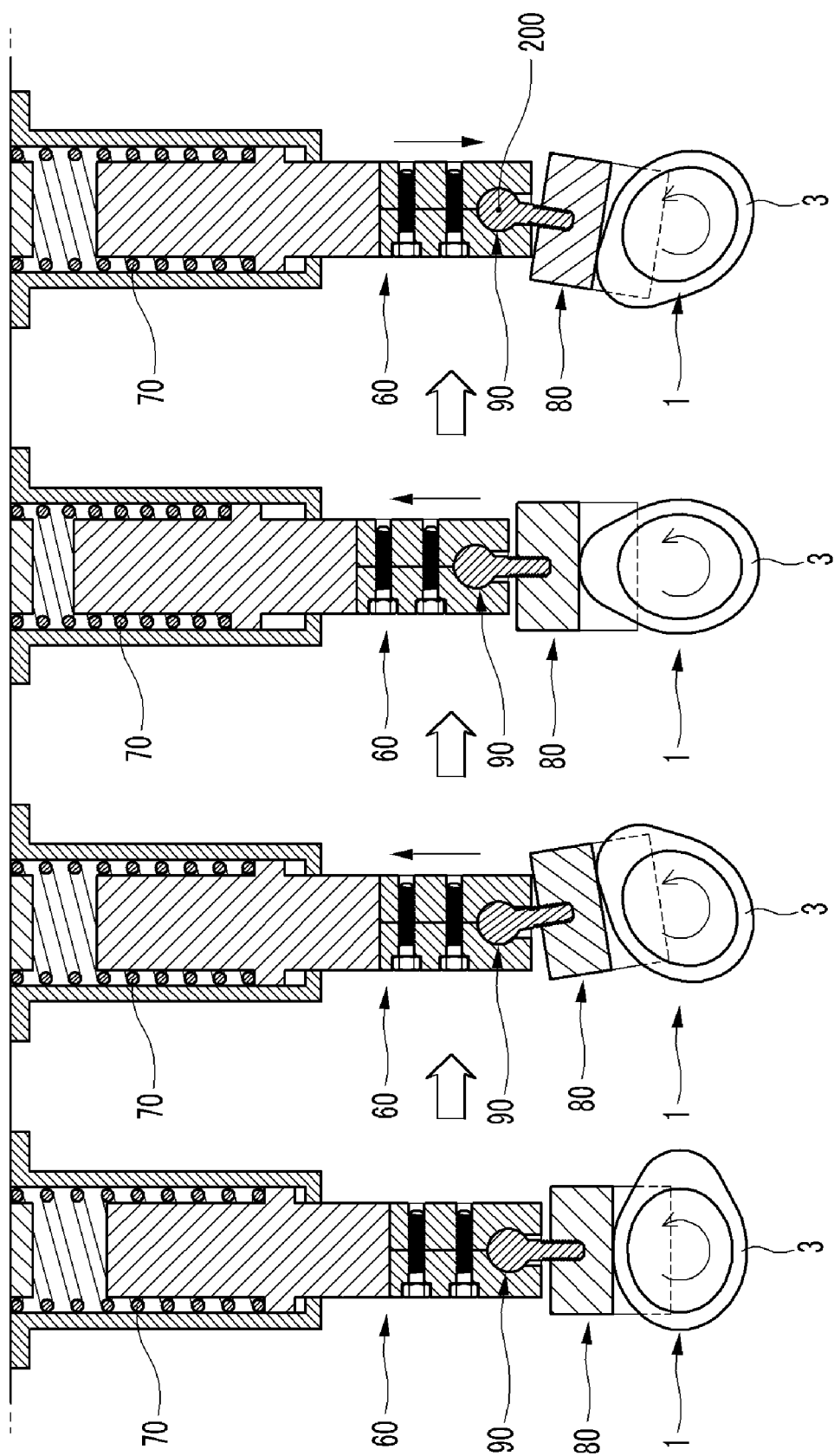

Particularly, FIG. 5C shows that the burr elimination tool 80 pivots in a left/right direction with respect to the center point 200 (see FIG. 2), and FIG. 5D shows that the burr elimination tool 80 pivots in a front/rear direction with respect to the center point 200 (see FIG. 2).

First, as shown in FIG. 5A, the camshaft 1 is loaded on the frame 10, one end of the camshaft 1 is clamped through the chucking member 21 of the rotation unit 20, and the center of the other end of the camshaft 1 is supported by the centering member 25.

In the above state, the operating cylinder 30 moves the ascent/descent member 40 in a lower direction.

Then, the elastic force of the spring 70 (FIG. 2) presses the burr elimination tool 80 to the cam lobe of the camshaft 1 with a uniform force.

As shown in FIG. 5B, the moving rod 60 is forced into the inner space of the cylinder member 50, and the spring 70 that is compressed transmits elastic force to the moving rod 60.

In addition, the edges of the cam lobes 3 of the camshaft 1 closely contact the serration 82 of the burr elimination cut-out 81 in the burr elimination tool 80, referring to FIG. 4.

Next, the camshaft 1 is rotated by the rotation unit 20 that is described in FIG. 5A, as shown in FIG. 5C, and the burr elimination tool 80 moves in a vertical direction corresponding to the trace of the cam lobes 3 to eliminate the burr of the cam lobes 3.

That is, when the edge portions of the cam lobes 3 closely contact the burr elimination cut-out 81 of the burr elimination tool 80, the camshaft 1 rotates such that the serration 82 of the burr elimination tool 80 produces friction with the burr to eliminate the burr.

In the above procedure, when the camshaft 1 rotates such that the nose portion of the cam lobe 3 contacts the burr elimination cut-out 81, the moving rod 60 moves upward.

When the base portion of the cam lobe 3 contacts the burr elimination cut-out 81, the moving rod 60 moves downward such that the burr elimination tool 80 moves downward.

Here, the burr elimination tool 80 pivots in a front/rear direction through the ball joint 90 corresponding to the rotation of the camshaft 1.

Accordingly, in the present exemplary embodiment, the burr elimination tool 80 moves in a vertical direction and simultaneously pivots in a front/rear direction according to the profile of the cam lobes 3 such that uniform contact pressure is transmitted to the cam lobes 3 to completely eliminate the burr of the cam lobes 3.

Further, in the present exemplary embodiment, the edge portions of the cam lobes 3 contact the V-shaped burr elimination cut-out 81 of the burr elimination tool 80 such that the burr elimination tool does not scratch the face of the cam lobe 3.

Also, the burr elimination tool 80 in which the burr elimination cut-out 81 and the serration 82 are formed is made of heat-treated tool steel such that the life span thereof can be extended.

Accordingly, in the present exemplary embodiment, the efficiency of the elimination of the burr of the cam lobe 3 is increased and a scratch is not formed on the surface of the cam lobe 3 such that the mechanical quality can be improved and the life span of the tool can be extended, and thereby the cost can be reduced.

Further, if there are position differences of the cam lobes 3, the position differences are compensated through the ball joint 90 corresponding to the mechanical tolerances or the specifications for the cam lobes 3 of the camshaft 1.

Referring to FIG. 5C, the burr elimination tool 80 pivots with respect to the center point 200 (see FIG. 2) of the ball joint 90 in front/rear and left/right directions within a predetermined angle such that one side surface of the burr elimination cut-out 81 that closely contacts the exterior circumference of the cam lobe 3 corresponds to the tangential line that passes the exterior circumference of the cam lobe 3.

Accordingly, the burr elimination tool 80 efficiently and quickly eliminates the burr that is formed in the edge of the cam lobe 3.

Referring to FIG. 5D, if a pair of cam lobes 3 are spaced apart by L1 corresponding to the distance between the burr elimination tools 80, the burr elimination tools 80 normally eliminate the burrs of the cam lobes 3.

If a pair of cam lobes 3 are spaced apart by L2 that is shorter than the base distance L1, the burr elimination tools 80 pivot in an inside direction (a left/right direction) of the cam lobes 3 to eliminate the burrs of the cam lobes 3.

Also, if a pair of cam lobes 3 are spaced apart by L3 that is longer than the base distance L1, the burr elimination tools 80 pivot in an outside direction (a left/right direction) of the cam lobes 3 to eliminate the burrs of the cam lobes 3.

Accordingly, in the present exemplary embodiment, the burr elimination tool 80 compensates position differences of the cam lobes according to the position tolerance or specifications of the cam lobes 3 such that the burrs of the cam lobes 3 are completely and flexibly eliminated, corresponding to a variety of specifications of the camshaft 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A burr elimination device for a camshaft, comprising:
   an operating cylinder configured to move a rod equipped in an end portion thereof in an up and down direction;
   an ascent/descent member connected to the rod of the operating cylinder;
   a rotation unit configured to rotate a camshaft that is held apart from the ascent/descent member and on which cam lobes are formed;
   a plurality of cylinder members disposed on the ascent/descent member corresponding to the cam lobes;
   a moving rod configured to be inserted into or drawn out of each of the cylinder members;
   a spring mounted inside each of the cylinder members and configured to elastically push the moving rod from the interior to the exterior of the cylinder member; and
   a burr elimination tool that is mounted on the end portion of the moving rod and that is configured to pivot in front/rear and left/right directions with respect to a predetermined center point for continuous elimination of a burr that is formed at an edge of a cam lobe.

2. The burr elimination device for a camshaft of claim 1, wherein a V-shaped burr elimination cut-out which contacts edge portions of the cam lobe is formed in the burr elimination tool and at least one portion of the bottom surface of which is serrated.

3. The burr elimination device for a camshaft of claim 1, wherein the burr elimination tool is rotatably connected to a protruding end portion of the moving rod through a ball joint.

4. The burr elimination device for a camshaft of claim 3, wherein the moving rod includes a rod body that is disposed inside the cylinder member corresponding to the moving rod, and is provide with a shoulder formed at an exterior circumference thereof, and a mounting portion that is formed in the end portion of the rod body for the burr elimination tool to be mounted thereto.

5. The burr elimination device for a camshaft of claim 4, wherein the mounting portion includes a first part that is integrally formed in the end portion of the rod body and a second part that is combined to the first part through a bolt, and the ball joint is rotatably mounted between the first and second parts.

6. The burr elimination device for a camshaft of claim 5, wherein a mounting socket is respectively formed in the first and second parts for the ball joint to be mounted.

7. The burr elimination device for a camshaft of claim 3, wherein the ball joint includes a ball member that is rotatably supported by the end portion of the moving rod and a ball stud that is inserted into the burr elimination tool to be connected thereto.

8. The burr elimination device for a camshaft of claim 6, wherein the ball joint includes a ball member that is disposed in the mounting socket and a ball stud that is integrally formed with the ball member to be inserted into the burr elimination tool, and the mounting socket includes a socket that is jointly formed in the first member and the second member to support the ball member and a clearance hole that communicates with the socket to allow the ball stud to freely protrude therethrough.

9. The burr elimination device for a camshaft of claim 7, wherein the burr elimination tool is provided with a union hole into which the ball stud is inserted.

10. A burr elimination device for a camshaft, comprising:
an operating cylinder;
a rotation unit configured to rotate a camshaft on which cam lobes are formed;
moving rods each movable in an up/down direction by the operating cylinder;
a spring configured to elastically support each of the moving rods; and
a burr elimination tool that is connected to the end portion of each of the moving rods through a ball joint to continuously eliminate a burr that is formed at the edge portion of the cam lobe,
wherein the burr elimination tool pivots in front/rear and left/right directions within a predetermined angle so that one side surface of a burr elimination cut-out that contacts edge portions of the exterior circumference of the cam lobe coincides with a tangential line passing the exterior circumference.

11. The burr elimination device for a camshaft of claim 10, wherein a V-shaped burr elimination cut-out which contacts edge portions of the cam lobe is formed in the burr elimination tool and at least one portion of the bottom surface of which is serrated.

* * * * *